(12) United States Patent
Grossman et al.

(10) Patent No.: US 11,295,400 B2
(45) Date of Patent: Apr. 5, 2022

(54) AUTOMATED SUPERVISION OF CONSTRUCTION OPERATIONS IN AN INTELLIGENT WORKSPACE

(71) Applicant: Autodesk, Inc., San Rafael, CA (US)

(72) Inventors: Tovi Grossman, Toronto (CA); George Fitzmaurice, Toronto (CA); Anderson Nogueira, Toronto (CA); Nick Beirne, Toronto (CA); Justin Frank Matejka, Newmarket (CA); Danil Nagy, New York, NY (US); Steven Li, Toronto (CA); Benjamin LaFreniere, Toronto (CA); Heather Kerrick, Oakland, CA (US); Thomas White, Burlington (CA); Fraser Anderson, Camrose (CA); Evan Atherton, San Carlos, CA (US); David Thomasson, Fairfax, CA (US); Arthur Harsuvanakit, San Francisco, CA (US); Maurice Ugo Conti, Muir Beach, CA (US)

(73) Assignee: AUTODESK, INC., San Rafael, CA (US)

(*) Notice: Subject to any disclaimer, the term of this patent is extended or adjusted under 35 U.S.C. 154(b) by 512 days.

(21) Appl. No.: 15/359,182

(22) Filed: Nov. 22, 2016

(65) Prior Publication Data
US 2017/0148116 A1    May 25, 2017

Related U.S. Application Data

(60) Provisional application No. 62/259,030, filed on Nov. 23, 2015.

(51) Int. Cl.
*G06Q 50/08* (2012.01)
*G06Q 10/06* (2012.01)

(52) U.S. Cl.
CPC ....... *G06Q 50/08* (2013.01); *G06Q 10/06311* (2013.01)

(58) Field of Classification Search
CPC .................. G06Q 50/08; G06Q 10/06311
(Continued)

(56) References Cited

U.S. PATENT DOCUMENTS 7,945,470 B1 * 5/2011 Cohen .................... G06Q 10/06
705/7.13
9,727,376 B1 * 8/2017 Bills .................. G06Q 10/0631
(Continued)

Primary Examiner — Dylan C White
(74) Attorney, Agent, or Firm — Artegis Law Group, LLP

(57) ABSTRACT

One embodiment of the present invention sets forth a technique for performing tasks associated with a construction project. The technique includes transmitting to a worker, via a mobile computing device worn by the worker, a first instruction related to performing a first task included in a plurality of tasks associated with a construction project, and transmitting to a light-emitting device a command to provide a visual indicator to the worker that facilitates performing the first task, based on an input received from the mobile computing device, determining that the worker has completed the first task of the construction project, selecting, from a database that tracks eligibility of each of the plurality of tasks, a second task included in the plurality of tasks that the worker is eligible to perform, and transmitting to the worker, via the mobile computing device, a second instruction related to performing the second task.

18 Claims, 5 Drawing Sheets

(58) Field of Classification Search
USPC .......................................................... 705/7.13
See application file for complete search history.

(56) References Cited

U.S. PATENT DOCUMENTS

| | | | | |
|---|---|---|---|---|
| 9,805,315 | B1* | 10/2017 | Cohen | G06Q 10/06 |
| 9,817,839 | B2* | 11/2017 | Kahle | G06Q 10/06 |
| 9,830,567 | B2* | 11/2017 | Weiss | G06Q 10/06311 |
| 10,086,756 | B2* | 10/2018 | Manci | B60Q 9/00 |
| 2008/0164998 | A1* | 7/2008 | Scherpbier | G16H 40/20 |
| | | | | 340/539.13 |
| 2009/0048868 | A1* | 2/2009 | Portnoy | G06Q 10/06316 |
| | | | | 705/2 |
| 2009/0156231 | A1* | 6/2009 | Versteeg | G01S 5/0252 |
| | | | | 455/456.1 |
| 2009/0265105 | A1* | 10/2009 | Davis | G01C 21/20 |
| | | | | 701/300 |
| 2012/0150578 | A1* | 6/2012 | Mangat | G06Q 10/00 |
| | | | | 705/7.13 |
| 2012/0216106 | A1* | 8/2012 | Casey | G06F 17/243 |
| | | | | 715/224 |
| 2013/0262171 | A1* | 10/2013 | Solodko | G01C 21/343 |
| | | | | 705/7.18 |
| 2014/0081700 | A1* | 3/2014 | Mehta | G06Q 10/06 |
| | | | | 705/7.28 |
| 2014/0214631 | A1* | 7/2014 | Hansen | G06Q 10/087 |
| | | | | 705/28 |
| 2014/0278638 | A1* | 9/2014 | Kreuzkamp | G06Q 10/06398 |
| | | | | 705/7.15 |
| 2015/0379457 | A1* | 12/2015 | Jackson | G06Q 10/063118 |
| | | | | 705/7.17 |
| 2017/0301039 | A1* | 10/2017 | Dyer | H04M 1/00 |
| 2018/0082051 | A1* | 3/2018 | Gibbs | H04W 4/80 |

* cited by examiner

AUTOMATED SUPERVISION OF CONSTRUCTION OPERATIONS IN AN INTELLIGENT WORKSPACE

CROSS-REFERENCE TO RELATED APPLICATIONS

This application claims the benefit of U.S. provisional patent application titled, "Hive User Experience," filed on Nov. 23, 2015 and having Ser. No. 62/259,030. The subject matter of this related application is hereby incorporated herein by reference.

BACKGROUND OF THE INVENTION

Field of the Invention

Embodiments of the present invention relate generally to human-computer interaction (HCI) and automated construction and, more specifically, to automated supervision of construction operations in an intelligent workspace.

Description of the Related Art

One issue confronting traditional manual construction operations is that a foreman is required to monitor such operations. Specifically, for optimal efficiency, the foreman is typically required to perform a number of time-consuming actions for a specific work task, including frequently communicating with the one or more workers involved in completing the specific work task, coordinating the activities of the one or more workers, and manually confirming that the specific work task has been completed. These responsibilities can quickly overwhelm a single foreman, especially in larger construction projects.

In addition to the above burdens, when of workers are provided for a construction project via crowdsourcing, the normal workload of the foreman can be increased substantially. In particular, when workers are sourced via a crowdsourcing mechanism, the workers are typically volunteers and are generally not trained construction professionals. Such workers can require extensive supervision, training, and quality control checks. All of these additional tasks typically fall on the shoulders of the project foreman. Thus, many of the benefits arising from the additional labor provided by crowd-sourced workers can be largely offset by the increased supervisory burdens associated with such workers that are imposed on the project foreman.

As the foregoing illustrates, what is needed in the art is a more effective approach for supervising and managing operations in construction projects.

SUMMARY OF THE INVENTION

One embodiment of the present invention sets forth a computer-implemented technique for performing tasks associated with a construction project. The technique includes transmitting to a worker, via a mobile computing device worn by the worker, a first instruction related to performing a first task included in a plurality of tasks associated with a construction project, and transmitting to a light-emitting device a command to provide a visual indicator to the worker that facilitates performing the first task, based on an input received from the mobile computing device, determining that the worker has completed the first task of the construction project, selecting, from a database that tracks eligibility of each of the plurality of tasks, a second task included in the plurality of tasks that the worker is eligible to perform, and transmitting to the worker, via the mobile computing device, a second instruction related to performing the second task.

At least one advantage of the techniques described herein is that workers can be employed in complicated assembly operations with little or no prior training and without direct human supervision, which is especially beneficial when unskilled workers are employed. Consequently, the added benefit of crowd-sourced and/or volunteer labor is not offset by the increased supervisory effort normally associated with such labor.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

In the following description, numerous specific details are set forth to provide a more thorough understanding of the embodiments of the present invention. However, it will be apparent to one of skill in the art that the embodiments of the present invention may be practiced without one or more of these specific details.

Hardware Overview

Figure 1:
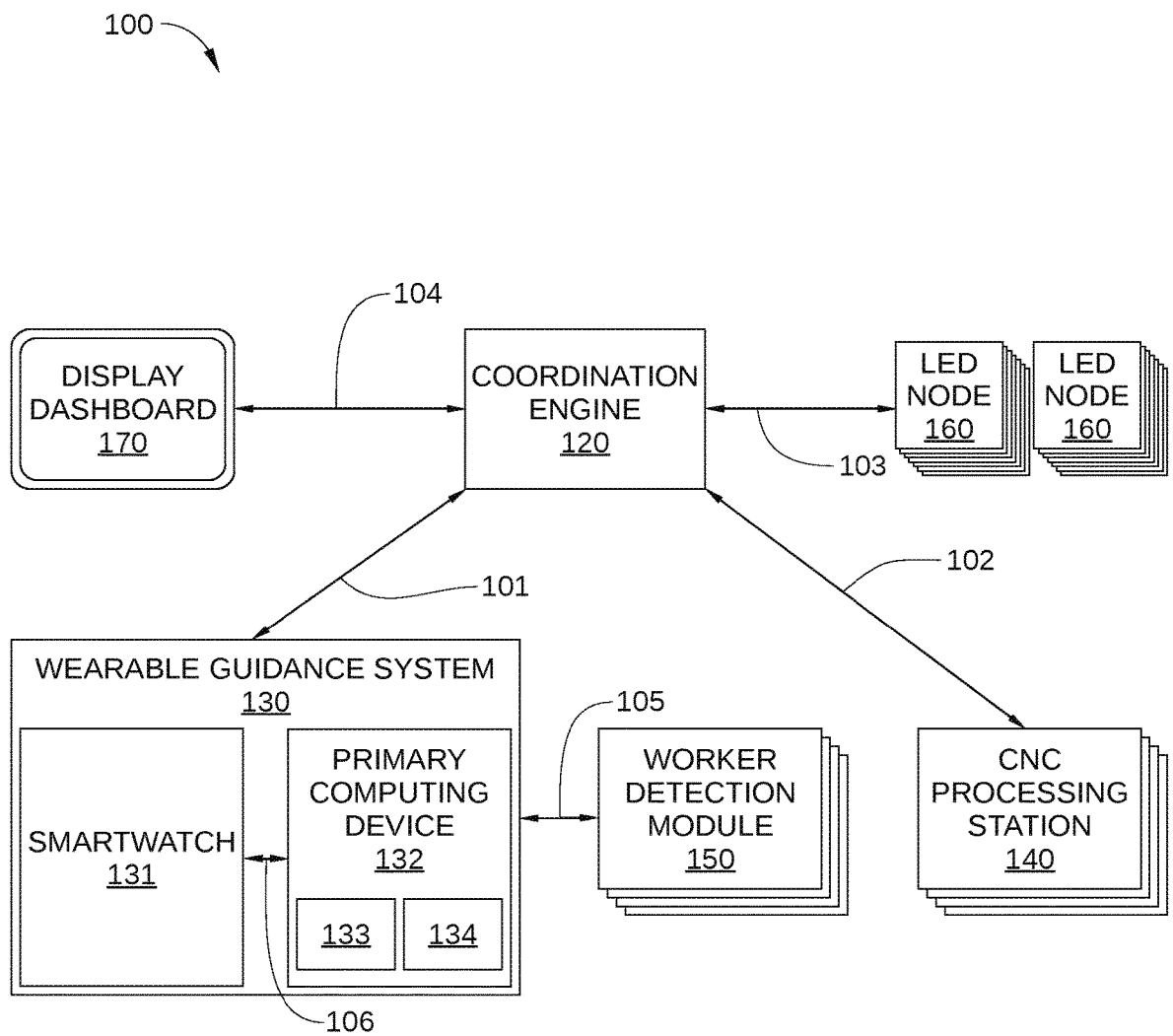
FIG. 1 is a block diagram of a computer-coordinated construction system configured to implement one or more aspects of the present invention.

FIG. 1 is a block diagram of a computer-coordinated construction system 100 configured to implement one or more aspects of the present invention. Computer-coordinated construction system 100 is an intelligent construction space configured to guide human workers in the fabrication and assembly of large-scale structures, and to manage the overall build process of such structures. In various embodiments, computer-coordinated construction system 100 employs wearable guidance systems, workspace location sensors, and instrumented construction materials to provide real-time guidance to workers, such as crowd-sourced volunteer workers, whose activities are coordinated by a coordination engine. As such, computer-coordinated construction system 100 includes a coordination engine 120, multiple wearable guidance systems 130, one or more computer numerical control (CNC) processing stations 140, and a plurality of worker detection modules 150 located throughout a workspace (not shown) for a particular construction project. In some embodiments, computer-coordinated construction system 100 also includes a plurality of light emitting diode (LED) nodes 160 and/or a display dashboard 170.

Coordination engine 120 is configured to manage a plurality of human workers engaged in a construction project. More specifically, coordination engine 120 provides context-sensitive instructions for each of these workers in real-time, and coordinates the particular tasks performed by each worker. In some embodiments, coordination engine 120 can determine the current location of a worker via wearable guidance system 130 (described below), and provide instructions to that particular worker accordingly. In addition, coordination engine 120 can guide a worker in employing one of CNC processing stations 140 in fabricating a component or module that is for addition to a structure being constructed. Thus, instructions provided to a worker by coordination engine 120 may be related to a robotic fabrication task, such as correctly loading a robotic assembly station with material, or to a construction or assembly task, such as adding a component to the structure. In some embodiments, coordination engine 120 is implemented as an application running on one or more computing devices, such as computing device 200, described below in conjunction with FIG. 2.

In some embodiments, coordination engine 120 includes or is configured to access an instruction database 121. Instruction database 121 generally includes entries for and thereby tracks each instruction that is to be provided to workers for the completion of a particular construction project. Thus, instruction database 121 tracks the current status of each such instruction, thereby facilitating the selection of instructions by coordination engine 120 during operations. For example, each individual instruction can be flagged to indicate a different status, e.g., "issued," "completed," "not yet issued," etc. When coordination engine 120 receives an indication that the status of a particular instruction has changed, the appropriate entry in instruction database 121 is updated accordingly.

Coordination engine 120 is further configured to communicate with the various components of computer-coordinated construction system 100 via wired and/or wireless communications, as appropriate. For example, in some embodiments, coordination engine 120 is configured to communicate with each of wearable guidance systems 130 via a wireless connection 101, such as a Wi-Fi or any other suitable wireless connection; with each CNC processing station 140 via a wired connection 102, such as an Ethernet or other suitable wired connection; with each of LED nodes 160 via a wireless connection 103, such as a 2.4 GHz industry, scientific, and medical (ISM) radio band; and with display dashboard 170 via a wired connection 104, such as a high-definition multimedia interface (HDMI). In other embodiments, wired connection 102 and/or wireless connection 104 may be replaced with a Wi-Fi or other suitable wireless connection.

Each wearable guidance system 130 is configured to enable workers to receive real-time guidance and feedback from coordination engine 120 while participating in a construction project. Specifically, a worker instrumented with a wearable guidance system 130, hereinafter referred to as "the worker;" receives real-time, illustrated instructions based on the current location of the worker. The current location is determined by wearable guidance system 130 in communication with one or more of worker detection modules 150 (described below). In addition, the real-time instructions sent to the worker may be further based on what operation or task has most recently been completed by the worker.

In some embodiments, each wearable guidance system 130 includes a smartwatch 131 or other wearable display screen-equipped computing device. Smartwatch 131 is configured to provide one or more visual, audible, and/or a tactile (e.g., vibration-based) instructions or signals to a worker instrumented, e.g., wearing, wearable guidance system 130. For example, a specific instruction may be visually displayed on a display screen of smartwatch 131, and may include an image or images, a video segment, and/or text-based instructions. Alternatively or additionally, a tactile signal, such as a vibration, may be generated by smartwatch 131 to indicate that a new instruction or other pertinent information is being displayed by the display screen of smartwatch 131. Alternatively or additionally, an audible signal, such as a tone or voice command, may be generated by smartwatch 131 to provide instructions to the worker wearing wearable guidance system 130 and/or to indicate that a new instruction or other pertinent information is being displayed by the display screen of smartwatch 131 for the worker. Thus, the instruction or instructions provided by smartwatch 131 may be visual (e.g., displayed) instructions, and/or audible (e.g., voice) instructions.

Because smartwatch 131 is worn by a worker on the wrist, smartwatch 131 enables real-time visual instructions to be provided to the worker in an unobtrusive and generally "hands-free" manner. That is, a worker can consult the instructions provided by smartwatch 131 without setting down objects currently in hand. Thus, consulting instructions by the worker does not interrupt whatever task the worker is currently engaged in, as is typically the case when a smartphone, electronic tablet, laptop computer, and the like is consulted.

The visual and/or audible instructions provided to the worker by wearable guidance system 130 may be given to the worker in response to one or more different conditions. In some embodiments, an instruction is provided to the worker when a certain communication is received from coordination engine 120. For example, coordination engine 120 may detect that a particular CNC processing station 140 has completed a task, and in response thereto sends a notification to wearable guidance system 130 indicating the completion of the task. Alternatively or additionally, in some embodiments coordination engine 120 may send the instructions to be provided to the worker to wearable guidance system 130, rather than sending the above-described wearable guidance system 130. In such embodiments, wearable guidance system 130 causes the received instructions to be displayed or played, but does not determine what instructions to provide to the worker.

In some embodiments, visual and/or audible instructions are provided to the worker by wearable guidance system 130 based on a determination by wearable guidance system 130 that the worker is at a specific location within a designated work area of a particular construction project. For example, based on signals received from one or more of worker detection modules 150, location determination application 133 (described below), can determine that the worker has moved from one location within the designated work area of the construction project to another location within the designated work area. In response, wearable guidance system 130 then provides appropriate visual and/or audible instructions to the worker. Similarly, when a worker has moved to an incorrect station within the designated work area, based on this incorrect location, wearable guidance system 130 provides visual and/or audible instructions notifying the worker thereof.

In some embodiments, visual and/or audible instructions are provided to the worker by wearable guidance system 130 based on a request by the worker to advance to the next appropriate task for the worker. For example, when a worker requests advancement to a next instruction page by swiping the display screen of smartwatch 131, tapping a "Next" task icon on the display screen, etc., wearable guidance system 130 provides the appropriate instructions for the next task to be completed by the worker.

In some embodiments, visual and/or audible instructions are provided to the worker by wearable guidance system 130 based on a particular event occurring within the work area of the construction project. For example, upon completion of a fabrication operation by a particular CNC processing station 140, smartwatch 131 provides an appropriate instruction to the worker, such as a vibration indicating that CNC processing station 140 has completed the fabrication operation and/or a text-based instruction indicating that the worker can retrieve a completed module or other component from the CNC processing station 140. In such embodiments, wearable guidance system 130 may be notified via coordination system 120, which initially receives such a notification from CNC processing station 140. Similarly, wearable guidance system 130 provides an appropriate instruction to the worker via smartwatch 131 when a task is determined to be completed by the worker, either by a confirmation provided by the worker or by a signal generated by instrumented construction material employed in the task just completed.

In some embodiments, wearable guidance system 130 also includes a primary computing device 132, such as a smartphone or electronic tablet. In such embodiments, primary computing device 132 provides additional computing power and/or communication functionality, such as WiFi capability, to wearable guidance system 130. Primary computing device 132 can also provide a larger interactive canvas to the worker for advanced operations, such as configuring a smartwatch app running on smartwatch 131. For example, a worker may want to configure the type of notifications which are received, or specify calibration settings for the worker detection algorithm, or view the status of the current job. Doing so may be more convenient on primary computing device 132, since primary computing device 132 generally includes a larger screen than smartwatch 131.

In addition, in such embodiments, primary computing device 132 communicates with smartwatch 131 via a wired or, preferably, a wireless connection 106, such as a Bluetooth short-wavelength ultra-high frequency (UHF) connection. In some embodiments, primary computing device 132 is WiFi-capable, to enable wireless communication between wearable guidance system 130 and coordination engine 120. In some embodiments, primary computing device 132 runs a location determination application 133 and an instruction display application 134, each described below. In other embodiments, the functionality of location determination application 133 and/or instruction display application 134 may instead be implemented in coordination engine 120.

Location determination application 133 is configured to determine a location of the worker, for example based on signals received by primary computing device 132 from one or more of worker detection modules 150. In some embodiments, one worker detection module 150 is located at each work station within the designated work area of a particular construction project, and signals received by primary computing device 132 are processed using a heuristic based on a received signal strength indication to determine at which particular work station within the designated work area the worker is located. In other embodiments, any other location determination algorithm may be employed in location determination application 133 based on signals received from one or more of worker detection modules 150.

Instruction display application 134 may be configured to provide one or more visual, audible, and/or tactile instructions or signals to the worker. In some embodiments, instruction display application 134 causes specific instructions to be provided to the worker based on a communication from coordination engine 120. In such embodiments, the communication from coordination engine 120 may indicate what instructions are to be provided to the worker, or may include the instructions themselves. Alternatively or additionally, instruction display application 134 is configured to cause specific instructions to be provided to the worker based on one or more conditions being detected by smartwatch 131, including: a determination by wearable guidance system 130 that the worker is at a specific location within a designated work area of a particular construction project; a request by the worker to advance to the next appropriate task for the worker; and/or a particular event occurring within the work area of the construction project. Thus, based on a communication from coordination engine 120 and/or on one or more conditions being detected by wearable guidance system 130, instruction display application 134 can display a suitable instruction to the worker that enables the worker to advance completion of the current construction project based on real-time feedback from the worker and/or devices embedded within the work area of the construction project.

Each CNC processing station 140 is a hybrid fabrication and/or assembly station that includes one or more CNC devices, robots, or other technically feasible computer-aided devices (not shown) that can benefit from human assistance, such as loading and unloading of work pieces, programming for a particular function, etc. For example, in some embodiments, a CNC processing station 140 includes a robot configured and programmed to perform a certain fabrication operation on raw materials provided by a human worker. Because robotic assembly and fabrication processes typically include a plurality of pre-programmed actions, inaccurate or incorrect placement of a work piece can prevent the fabrication process from being properly completed. According to embodiments described herein, coordination engine 120, wearable guidance system 130, and in some embodiments instrumented construction materials provide real-time instructions and feedback to an untrained worker loading and unloading a work piece on a robot for a fabrication operation. Consequently, CNC processing station 140 can be employed to fabricate and/or assemble components for the construction project even though interacting with the robot requires training and trained workers are not available.

In some embodiments, CNC processing station 140 includes one or more numerically controlled robots, work piece positioning sensors and/or jigs, and any other apparatus for enabling one or more different fabrication or assembly operations. In some embodiments, each of CNC processing stations 140 is configured for performing identical fabrication and/or assembly operations. In such embodiments, multiple workers can simultaneously perform a similar task in conjunction with a different respective CNC processing station 140, thereby enabling highly redundant tasks associated with the construction project to be performed in parallel. In other embodiments, some or all of CNC processing stations 140 are respectively configured for different fabrication operations, for example when the construction project involves a wider variety of robotic fabrication and/or assembly operations.

Each of worker detection modules 150 is configured to enable wearable guidance systems 130 and/or coordination engine 120 to determine the location of workers within the workspace of the construction project. As such, each worker detection module 150 includes a broadcasting beacon configured to broadcast an identifier to nearby portable electronic devices, such as wearable guidance systems 130. In some embodiments, each worker detection beacon includes a Bluetooth low energy (BLE) transmitter for transmitting the requisite identifier. In other embodiments, any other suitable wireless beacon or device capable of broadcasting location information to wearable guidance systems 130 may be included in each worker detection module 150.

LED nodes 160 are wireless LED devices that enable an instrumented environment in the workspace of a construction project. In some embodiments, each LED node 160 includes a wireless communication module, such as a 2.4 GHz ISM transceiver, a red-green-blue (RGB) LED control board, and an RGB LED assembly. Thus, coordination engine 120 can communicate with each LED node 160 to cause the LED node 160 to turn on, off, or blink in a specific color at any time, and thereby provide visual guidance to one or more workers in the workspace of the construction project.

For example, when an LED node 160 is located at each potential workspace of the construction project, LED nodes 160 can visually guide a particular worker to a specific location in the workspace by flashing a particular color, for example a color associated with that particular worker. Additionally or alternatively, when one or more LED nodes 160 are embedded in a CNC processing station 140, a worker interacting with the CNC processing station 140 can be visually guided in how to load, unload, orient, or otherwise position a work piece that is processed, assembled, or otherwise fabricated via CNC processing station 140.

Additionally or alternatively, when one or more LED nodes 160 are embedded in construction articles or materials for use in the construction project, a worker can be visually directed to the specific construction article or materials needed to accomplish a specific task. Further, such instrumented construction articles or materials can indicate to a work where in a structure the specific construction article or material is to be installed. Furthermore, a worker can be guided to orient the specific construction article or material correctly via visual indicators produced by the LED node 160 embedded in or attached to the specific construction article or material. Thus, with essentially no prior training, a worker can be guided, via suitably placed and controlled LED nodes 160, through a series of tasks or operations at different locations within the workspace. In addition, even when the series of tasks involves complicated interactions with one or more robotic assembly stations, a multifarious selection of different construction materials, and/or multiple work locations, an untrained worker can successfully complete the tasks.

Additionally or alternatively, in some embodiments, static visual guides may be disposed throughout a construction space, such as construction space 300 described below), and/or on specific construction articles or materials to be installed. For example, color-coded markings, labels, or other identifiers may be attached to construction articles, and on parts of a robot, and such identifiers can be referenced in instructions provided to the worker ("Go to robot Bishop"). Visual guides could also be placed on the materials that include numeric tags that are referenced in instructions provided to the worker ("Retrieve connector node G24").

Display dashboard 170 is a display device configured to display the status of the current construction project, for example by presenting status information to workers and/or to a human foreman or coordinator. In some embodiments, dashboard display 170 shows what modules or other components have been added to a structure being constructed; what workers are currently performing tasks associated with the construction project and what modules or components each worker is fabricating, assembling, and/or installing; what robots, machinery, or CNC devices are present in the workspace, the status of each robot, and which worker is currently using each robot; a status of project completion; what modules or other components still need to be added to the structure; a system log indicating events being sent to each wearable guidance system 130 or to coordination engine 120; and the like.

Figure 2:
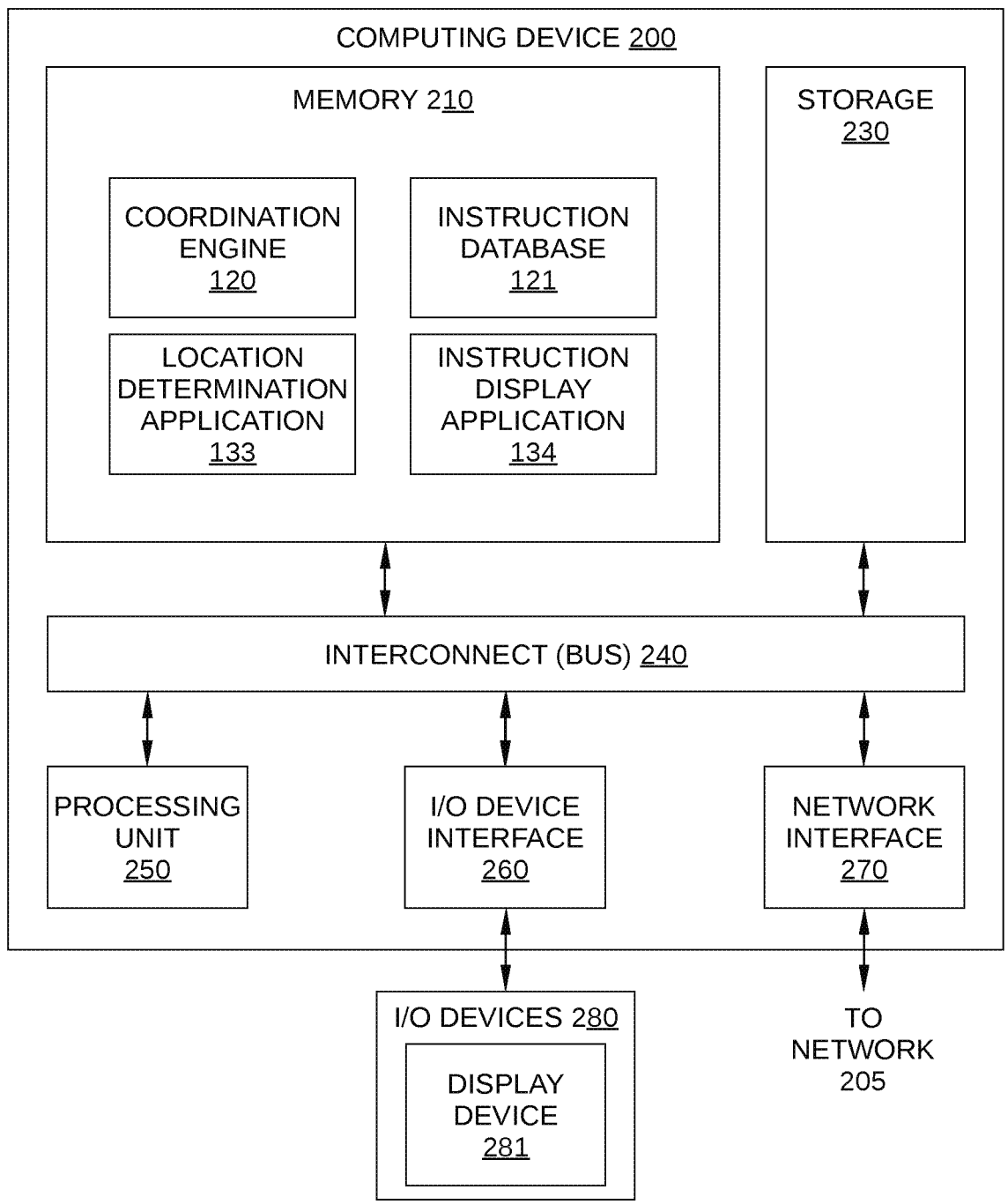
FIG. 2 illustrates a computing device configured to implement one or more aspects of the present invention.

FIG. 2 illustrates a computing device 200 configured to implement one or more aspects of the present invention. Computing device 200 may be a desktop computer, a laptop computer, a smart phone, a personal digital assistant (PDA), video game console, set top console, tablet computer, or any other type of computing device configured to receive input, process data, and display images, and is suitable for practicing one or more embodiments of the present invention. Computing device 200 is configured to run a coordination engine 120 that resides in a memory 210. In some embodiments, computing device 200 is further configured to display graphical images and/or videos to an end-user via input/output (I/O) devices 280 (described below). In some embodiments, computing device 200 is also configured to run location determination application 133 and/or instruction display application 134, rather than the various primary computing devices 132 of wearable guidance systems 130. It is noted that the computing device described herein is illustrative and that any other technically feasible configurations fall within the scope of the present invention.

As shown, computing device 200 includes, without limitation, an interconnect (bus) 240 that connects a processing unit 250, an input/output (I/O) device interface 260 coupled to input/output (I/O) devices 280, memory 210, a storage 230, and a network interface 270. Processing unit 250 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 250 may be any technically feasible hardware unit capable of processing data and/or executing software applications, including coordination engine 120. Further, in the context of this disclosure, the computing elements shown in computing device 200 may correspond to a physical computing system (e.g., a system in a data center) or may be a virtual computing instance executing within a computing cloud.

I/O devices 280 may include devices capable of providing input, such as a keyboard, a mouse, a touch-sensitive screen, and so forth, as well as devices capable of providing output, such as display dashboard 170. Display dashboard 170 may be a computer monitor, a video display screen, a display apparatus incorporated into a hand held device, or any other technically feasible display screen configured to present dynamic or animated media to an end-user. In some embodiments, display dashboard 170 is a terminal window displayed on another display device, such as a video display window that has been opened by coordination engine 120. Additionally, I/O devices 280 may include devices capable of both receiving input and providing output, such as a touchscreen, a universal serial bus (USB) port, and so forth. I/O devices 280 may be configured to receive various types of input from an end-user of computing device 200, and to also provide various types of output to the end-user of computing device 200, such as displayed digital images or digital videos. In some embodiments, one or more of I/O devices 280 are configured to couple computing device 200 to a network 205.

Network 205 may be any technically feasible type of communications network that allows data to be exchanged between computing device 200 and external entities or devices, such as a web server or another networked computing device. For example, network 205 may include a wide area network (WAN), a local area network (LAN), a wireless (WiFi) network, and/or the Internet, among others.

Memory 210 may include a random access memory (RAM) module, a flash memory unit, or any other type of memory unit or combination thereof. Processing unit 250, I/O device interface 260, and network interface 270 are configured to read data from and write data to memory 210. Memory 210 includes various software programs that can be executed by processor 250 and application data associated with said software programs, including coordination engine 120 and an instruction database 121. In some embodiments, memory 210 also includes location determination application 133 and instruction display application 134.

Intelligent Construction Space

Figure 3:
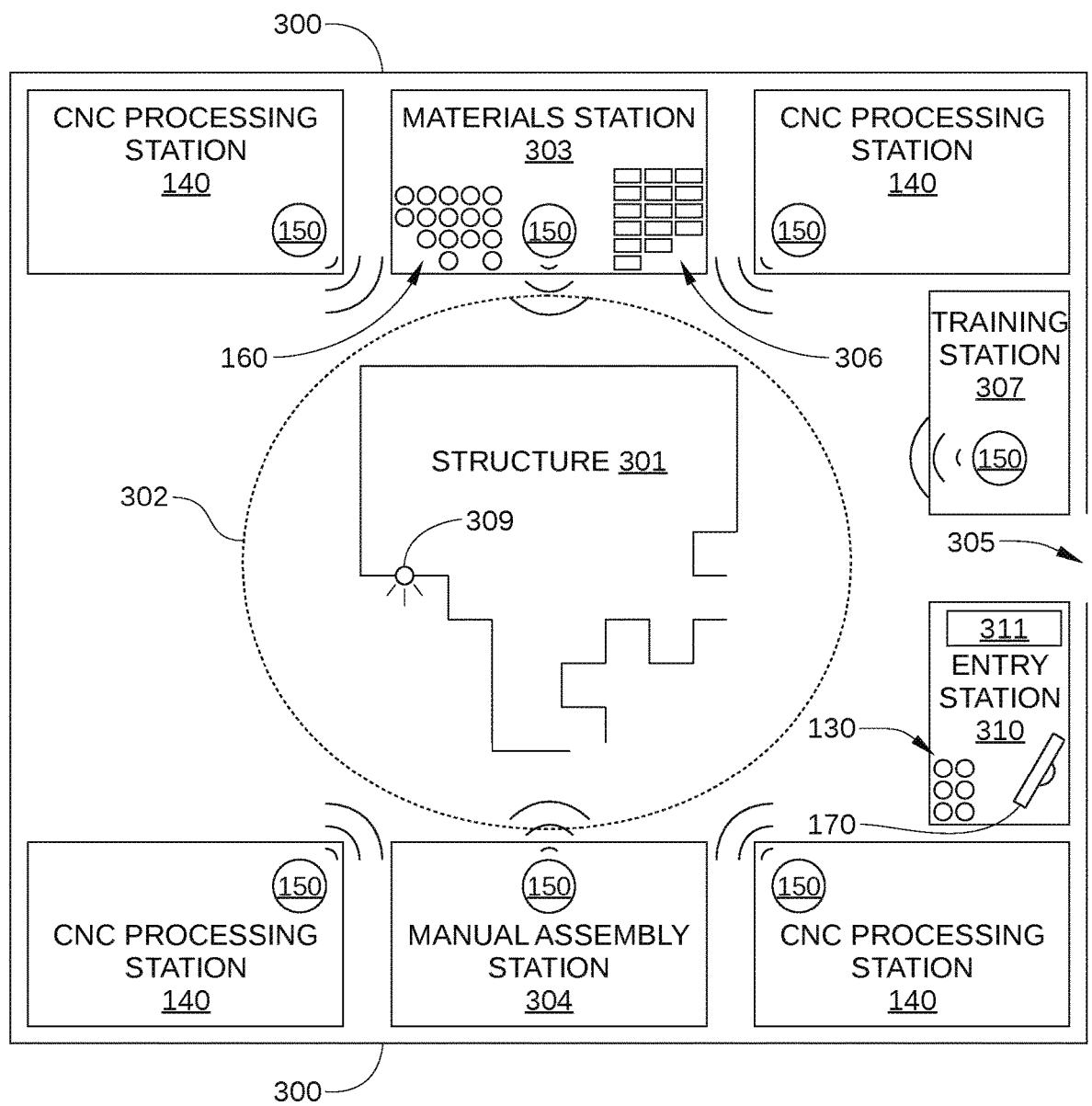
FIG. 3 is a schematic illustration of a construction space in which the computer-coordinated construction system of FIG. 1 can be implemented, according to one or more aspects of the present invention.

FIG. 3 is a schematic illustration of a construction space 300 in which computer-coordinated construction system 100 can be implemented, according to one or more aspects of the present invention. Construction space 300 includes a structure 301 that is located within a work area 302 and is the object of a construction project managed by coordination engine 120 (not shown). Construction space 300 further includes CNC processing stations 140, a materials station 303, a manual assembly station 304, an entry station 310 disposed proximate to an entrance 305 of construction space 300, and a training station 307. As shown, one or more worker detection modules 150 are collocated with each of the robotic work stations 140, materials station 303, manual assembly station 304, training station 307, and entry station 310. Worker detection modules 150 are configured to enable tracking of worker location within construction space 300. In addition, one or more LED nodes 160 (not shown for clarity) are also collocated with each of the robotic work stations 140, materials station 303, manual assembly station 304, training station 307, and entry station 310. LED nodes 160 are configured for guiding workers to a particular location within construction space 300.

Structure 301 may be any large-scale structure suitable for construction via multiple workers who are guided and directed by coordination engine 120. For example, structure 301 may be a room, pavilion, large-scale apparatus, or any other architectural-scale structure or apparatus.

Materials station 303 is a storage location for materials and/or components to be added to structure 301, work pieces 306 to be modified at one or more of CNC processing stations 140, and, in some embodiments, LED nodes 160. The LED nodes 160 that are stored at materials station 303 are either previously embedded in or coupled to work pieces to be modified, or are configured to be embedded in or coupled to a particular work piece, for example at manual assembly station 304 or at one of CNC processing stations 140.

Manual assembly station 304 is a work station to which a worker is directed by coordination engine 120 to perform one or more manual assembly tasks as part of the construction project. For example, a worker may be directed to manual assembly station 304 to couple a particular LED node 160 to a particular workpiece or component, or to fabricate or assemble a component without robotic assistance. Typically, a worker directed to manual assembly station 304 has previously been directed to materials station 303 by coordination engine 120 to collect materials, components, and/or LED nodes as instructed.

Entry station 310 is an entrance point for construction space 300 that facilitates sign-in by a worker, for example via a badge scanner 311. At entry station 310, a worker is assigned a wearable guidance system 130 after signing in, and can immediately begin receiving instructions via the wearable guidance system 130. In some embodiments, entry station 310 may further include an instance of a display dashboard 170.

In operation, a worker enters construction space 300 via entrance 305, signs in at entry station 310, and is assigned and instrumented with a wearable guidance system 130. Coordination engine 120 is notified that the worker is now on-site and ready to begin performing tasks, for example via badge scanner 311 or any other suitable apparatus, such as a radio frequency identification (RFID) scanner. Coordination engine 120, or in some embodiments instruction display application 134, then causes a first instruction to be displayed to the worker via smartwatch 131 of wearable guidance system 130, for example "Proceed to Training Station 307." Concurrently, coordination engine 120 causes the appropriate LED node 160 (not shown) to visually guide the worker to the location associated with the first instruction. For example, an LED node 160 located at training station 307 is commanded to blink with a color that corresponds to a color associated with the wearable guidance system 130 worn by the worker.

When the worker reaches a location indicated by a particular instruction, the wearable guidance system 130 worn by the worker determines that the location of the worker coincides with the location associated with the instruction, and communicates to coordination engine 120 that the worker is at the designated location. Coordination engine 120 then causes the next instruction to be displayed to the worker, either by transmitting the instruction to wearable guidance system 130 or a notification to wearable guidance system 130 indicating what instruction to display next. The worker then continues to follow the instructions provided to complete a particular stage of construction of structure 301, which typically includes multiple individual tasks. For example, one stage of construction may include fabricating and then installing a particular module or component of structure 301. As noted above, instructions may be provided to the worker based on various conditions, including a determination being made that the worker is at a specific location within a designated work area or station of construction space 300; a request being made by the worker to advance to the next appropriate task for the worker; and/or a particular event occurring within the work area of the construction project.

In some embodiments, in addition to guiding a particular worker to a specific location, LED nodes 160 can be employed guide how a worker loads materials onto a robot in one of CNC processing stations 140. For example, when an instrumented work piece that includes one or more LED nodes 160 is loaded onto a robot in a CNC processing station 140, the one or more LED nodes 160, in conjunction with instructions provided via smartwatch 131, can indicate orientation and/or positioning of the work piece. For instance, instructions provided at CNC processing station 140 may indicate that the end of the work piece on which a flashing LED node 160 is disposed should be placed or positioned in a certain way or orientation. Further, when a task at CNC processing station 140 involves multiple instrumented workpieces, selection of the appropriate work piece from the multiple workpieces can be facilitated with an appropriate LED node 160 indicating which workpiece to employ in the currently performed task.

Alternatively or additionally, the use of passive visual indicators can be combined with indications provided by the LED nodes 160 to guide worker actions. For example, an LED node 160 located at a certain part of CNC processing station 140 can emit a color that matches a passive visual indicator attached to a portion of a particular workpiece. Thus, the color emitted by the LED node 160 indicates to the worker which portion of the workpiece should be placed at the part of the CNC processing station 140 collocated with the LED node 160.

In some embodiments, LED nodes 160 can be employed to guide where and/or how a worker installs a particular module or component onto structure 301. In some embodiments, one or more instrumented modules or components previously installed on structure 301 can indicate to a worker where the module or component the worker is using should be installed. For example, in some embodiments, flashing LED node 309 on structure 301 can indicate to a worker that the module or component the worker is holding should be installed proximate node 309. In such embodiments, when the worker received the instruction to install the module or component, flashing LED node 309 are commanded by coordination engine 120 to flash in a color associated with the worker in question, thereby providing visual, real-time guidance. In some embodiments, once the worker acknowledges being proximate flashing LED node 309, for example by swiping the display screen of smartwatch 131 to advance to the next instruction, coordination engine 120 commands flashing LED node 309 to indicate the correct orientation of the module or component to be installed. One such embodiment is illustrated in FIG. 4.

Intelligent Construction Space

Figure 4:
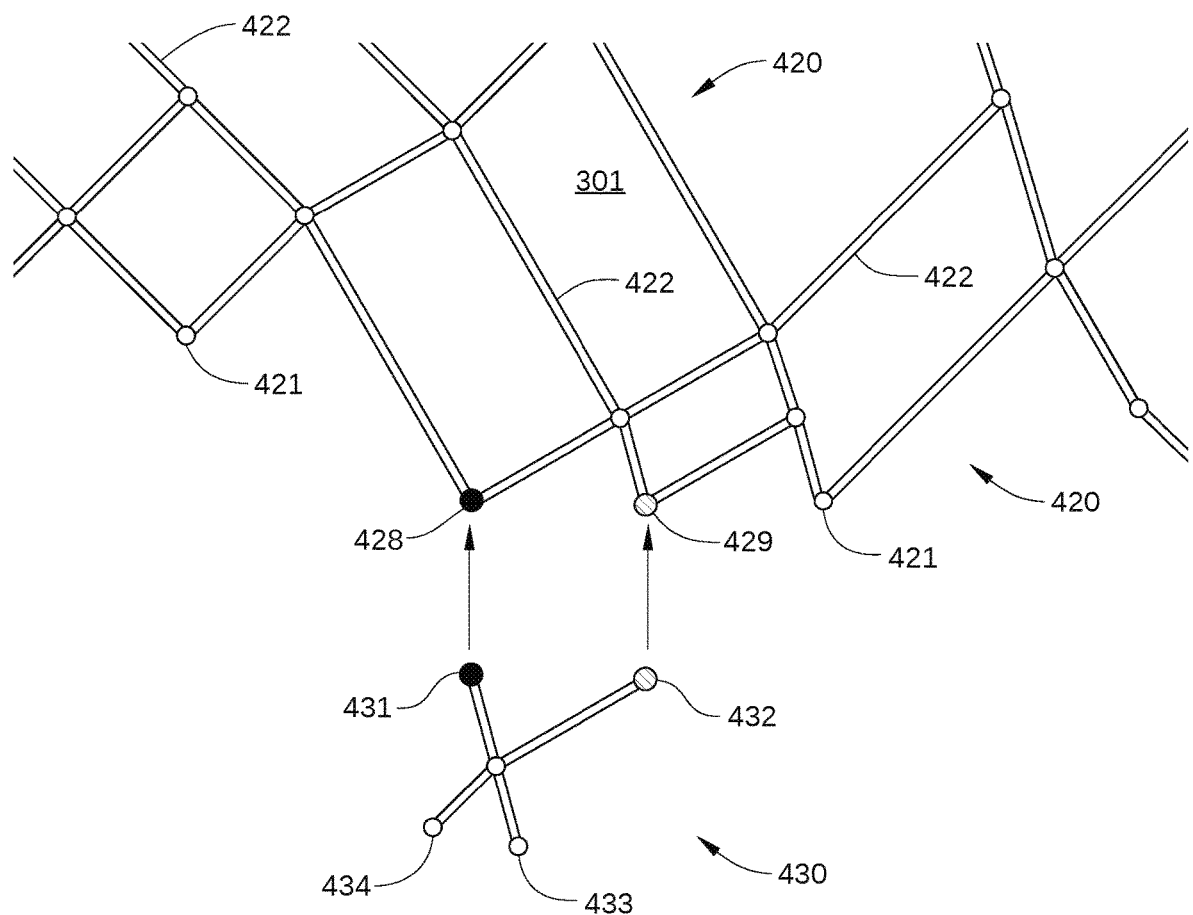
FIG. 4 schematically illustrates how the LED nodes of FIG. 1 visually guide the placement of a component onto a structure, according to various embodiments of the present invention.

FIG. 4 schematically illustrates how the LED nodes of FIG. 1 visually guide the placement of a component onto structure 301, according to various embodiments of the present invention. As shown, structure 301 is partially completed, and includes a plurality of previously installed components 420 that each include one or more attachment nodes 421 and one or more structural members 422. In the embodiment illustrated in FIG. 4, each attachment node 421 of structure 301 is configured with an LED node 160 (not shown for clarity), although in alternative embodiments, only a portion of attachment nodes 421 may be so configured.

Also shown in FIG. 4 is a component 430 that is to be installed onto structure 301 per instructions and visual guidance provided to an instrumented worker. The instructions are provided via wearable guidance system 130, as described above. The visual guidance for installation of component 430 is provided by one or more LED nodes of attachment nodes 421 in conjunction with one or more LED nodes included in component 401. Specifically, coordination engine 120 commands the LED node included in attachment node 428 to flash or constantly emit a first color, and the LED node included in attachment node 429 to flash or constantly emit a second color. Concurrently, coordination engine 120 commands the LED node included in attachment node 431 of component 430 to flash or constantly emit the first color, and the LED node included in attachment node 432 to flash or constantly emit the second color. Alternatively, component 430 may include passive visual indicators that match the colors emitted by attachment node and attachment node 429. In either case, the correct orientation and installation location of component 430 is visually indicated to the worker via the instrumented workpieces or modules and one or more components of structure 301. Once installed, the worker then requests, via smartwatch 131, to advance to the next instruction of the construction that the worker is performing. In so doing, wearable guidance system 130 receives confirmation that the instruction to install component 430 onto structure 301 is complete. Alternatively, in some embodiments, attachment nodes 421 may include a sensor configured to detect the attachment of component 430 thereto, thereby providing an automatically generated positive feedback to coordination engine 120 regarding completion of an installation instruction.

Workflow in an Intelligent Construction Space

Figure 5:
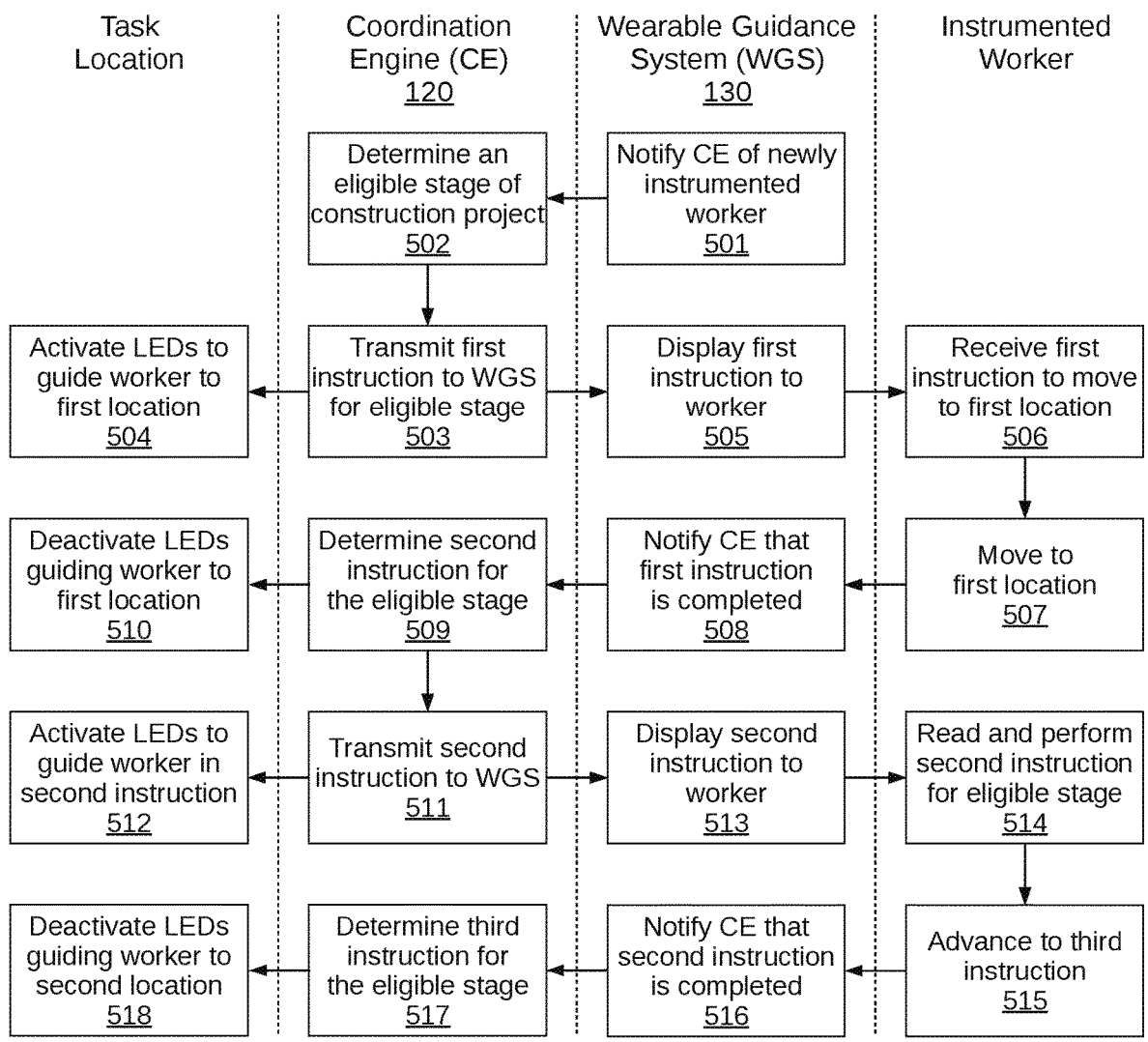
FIG. 5 is a flowchart of method steps for performing a task in an intelligent construction space, according to one embodiment of the present invention.

FIG. 5 is a flowchart of method steps for performing a task in an intelligent construction space, according to one embodiment of the present invention. Although the method steps are described in conjunction with the systems of FIGS. 1-4, persons skilled in the art will understand that any system configured to perform the method steps, in any order, is within the scope of the present invention. In some embodiments, prior to the method steps, a worker accesses the intelligent construction space. First, the worker logs in or is otherwise identified, and then the worker is instrumented with a wearable guidance system 130.

As shown, a method 500 begins at step 501, where wearable guidance system 130 notifies coordination engine 120 that a worker has been newly instrumented and is available to perform a stage of the construction of structure 301. For example, in some embodiments, wearable guidance system 130 notifies coordination engine 120 via wireless connection 101.

In step 502, coordination engine 120 determines an eligible stage of the construction of structure 301 that can be performed by the newly instrumented worker. That is, coordination engine 120 selects an eligible stage of construction to be performed by the worker from the plurality of stages of construction that have not yet been completed or begun. In addition, coordination engine 120 selects the eligible stage based on what other stages of construction are currently being performed. That is, a particular stage of construction is not considered eligible for assignment to the newly instrumented work unless activities and tasks associated therewith do not overlap in space and time with the stages of construction are currently being performed. Consequently, two workers will not be instructed to be in the same place at the same time, such as a particular robotic assembly station or location within work area 302.

In step 503, coordination engine 120 transmits a first instruction, or a notification indicating the first instruction, to wearable guidance system 130, for example via wireless connection 101. The first instruction is typically one of a plurality of instructions associated with the eligible stage of construction selected in step 502. For example, the first instruction may be "Proceed to Training Station." When the first instruction is associated with a particular location, coordination engine 120 also transmits a command to LED nodes 160 disposed at that particular location to visually guide the worker thereto. Typically, coordination engine 120 commands the LED nodes 160 at the particular location to flash or continuously emit light at a color associated with the worker, such as a color associated with the wearable guidance system 130 provided to the worker.

In step 504, when applicable, LED nodes 160 at the task location associated with the first instruction are activated to visually guide the worker to the location within work area 302 at which the first instruction is performed.

In step 505, wearable guidance system 130 receives the first instruction or a notification to display the first instruction, and displays the first instruction to the worker. In some embodiments, an audible and/or tactile signal may also be provided to the worker to indicate that a new instruction has arrived and to direct the attention of the worker to wearable guidance system 130.

In step 506, the worker receives and reads the first instruction, such as "Proceed to Training Station." As noted, one or more LED nodes 160 disposed at the location referenced in the first instruction provide visual guidance to the particular location.

In step 507, the worker performs the first instruction, for example moving to the first location. It is noted that the first location is visually indicated by activated LEDs displaying the color associated with the worker or the wearable guidance system provided to the worker. Upon completion of the first instruction, the worker requests advancing to the next instruction of the stage of construction, for example, by swiping to the next instruction available on smartwatch 131.

In step 508, wearable guidance system 130 receives an indication that the first instruction is completed and sends confirmation thereof to coordination engine 120, for example via wireless connection 101. In some embodiments, in step 508, wearable guidance system 130 determines that the worker has completed the first instruction by detecting that the worker is located at the location referenced in the first instruction, i.e., the first location.

In step 509, coordination engine 120 receives the confirmation transmitted by wearable guidance system 130 in step 508, and in response determines a second instruction for the worker. In some embodiments, each instruction issued to the worker is one of a fixed series of instructions, and are only provided in a specific order. In such embodiments, coordination engine 120 determines that the next instruction in the series of instructions associated with the stage of construction being performed by the worker is the second instruction. In other embodiments, some tasks to be performed by the worker may be completed in more than one fixed order. In such embodiments, coordination engine 120 is configured to select one or more such tasks that are less likely to conflict with other workers in work area 302 while still advancing completion of the current stage of construction. In such embodiments, in step 509, coordination engine 120 selects as the second instruction an instruction associated with one of the selected tasks, thereby avoiding conflict with other workers when possible. In some embodiments, coordination engine 120 selects the second instruction from instruction database 121 or some equivalent data structure. In addition, when applicable, in response to receiving confirmation that the first instruction is completed, coordination engine 120 also transmits a command to the LED nodes 160 activated in step 504 to deactivate.

In step 510, when applicable, LED nodes 160 at the task location associated with the first instruction are deactivated.

In step 511, coordination engine 120 transmits the second instruction, or a notification indicating the second instruction, to wearable guidance system 130, such as "Load Practice Workpiece on Dummy Robot". In addition, when the second instruction references an instrumented workpiece or component, coordination engine 120 transmits a command to LED nodes 160 embedded in or coupled to that particular workpiece or component, thereby visually guiding the worker, in real time, to select the correct workpiece or component. Typically, coordination engine 120 commands the LED nodes 160 associated with the workpiece or component of interest to flash or continuously emit light at a color associated with the worker or with wearable guidance system 130.

In step 512, the LED nodes 160 associated with the workpiece or component of interest are activated to flash or continuously emit light at a color associated with the worker, thereby visually guiding the worker to select the correct workpiece for performing the second instruction.

In step 513, wearable guidance system 130 displays the second instruction to the worker on the display screen of smartwatch 130. An audible and/or tactile signal may also be provided to the worker to indicate that second instruction has arrived.

In step 514, the worker reads and performs the second instruction, such as "Load Practice Workpiece on Dummy Robot". As noted, one or more LED nodes 160 embedded in or coupled to the appropriate workpiece referenced in the second instruction provide visual guidance in selecting the correct workpiece.

In step 515, upon completion of the second instruction, the worker requests advancing to the next instruction, i.e. the third instruction, for example by swiping to the next instruction available on smartwatch 131.

In step 516, wearable guidance system 130 receives an indication from the worker, such as a swipe or tap on smartphone 131, that the second instruction is completed. In response, wearable guidance system 130 sends confirmation of the completion of the second instruction to coordination engine 120.

In step 517, coordination engine 120 receives the confirmation transmitted by wearable guidance system 130 in step 516, and in response determines a third instruction for the worker. In addition, when applicable, in response to receiving confirmation that the second instruction is completed, coordination engine 120 also transmits a command to the LED nodes 160 activated in step 512 to deactivate.

Alternatively, in some embodiments, in step 517, coordination engine 120 receives a notification that the second instruction is completed from feedback provided by sensors included in the component or workpiece referenced in the second instruction, or by sensors configured to monitor the component or workpiece. Alternatively or additionally, in step 517, coordination engine 120 may receive a notification from an instrumented device in construction space 300, such as a robot included in one of CNC processing stations 140. For example, upon completion of a task initiated by the worker at a particular CNC processing station 140 as part of the second instruction, that CNC processing station 140 may be configured to provide a notification to coordination engine 120 that the second instruction has been completed.

In step 518, when applicable, LED nodes 160 embedded in or coupled to the workpiece associated with the second instruction are deactivated. Coordination engine 120 then provides additional instructions to the worker sequentially until the stage of construction selected for the worker is completed.

In sum, embodiments of the present invention provide techniques for managing construction of a structure in an intelligent workspace via a computer-assisted building process. In the embodiments, a coordination engine provides real-time instructions to a worker via a wearable guidance system and visual guidance cues via an instrumented workspace and/or instrumented construction materials. Together, the real-time instructions and visual guidance cues enable a worker, without human supervision, to successfully complete involved, multi-step tasks and robot-assisted fabrication or assembly operations.

At least one advantage of the techniques described herein is that workers can be employed in complicated assembly operations with little or no prior training and without direct human supervision, which is especially beneficial when unskilled workers are employed. Consequently, the added benefit of crowd-sourced and/or volunteer labor is not offset by the increased supervisory effort normally associated with such labor.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing tasks associated with a construction project, the method comprising:

monitoring a position of a worker within a space associated with the construction project via an electronic positioning system comprising at least one of indoor global positioning system (GPS), a micro-GPS system, an iBeacon system, or a radio frequency identification (RFID) system;

selecting a first task of the construction project from a plurality of tasks based on the position of the worker within the space;

transmitting to a mobile computing device worn by the worker, a first instruction related to performing the first task;

transmitting, from a computing system to a light-emitting device, a command to activate a visual indicator to the worker by emitting a particular color associated with the worker, wherein the computing system is separate from the mobile computing device, wherein the light-emitting device is separate from the mobile computing device and resides at a designated location associated with the first task, and wherein transmitting the command to the light-emitting device occurs separately from the mobile computing device;

based on an input received from the mobile computing device, determining that the worker has completed the first task of the construction project;

selecting, from a database that tracks eligibility of each of the plurality of tasks, a second task included in the plurality of tasks that the worker is eligible to perform; and transmitting to the worker, via the mobile computing device, a second instruction related to performing the second task.

2. The method of claim 1, wherein the first task of the construction project comprises the worker arriving at the designated location within a work space associated with the construction project.

3. The method of claim 1, wherein the first task of the construction project comprises performing one of a fabrication operation or an assembly operation of a component configured for constructing in-part a structure within a workspace associated with the construction project.

4. The method of claim 1, wherein determining that the worker has completed the first task comprises receiving via the mobile computing device a confirmation from the worker that the first task is complete.

5. The method of claim 1, wherein determining that the worker has completed the first task comprises detecting that the worker is positioned at the designated location within a work space associated with the construction project, wherein the position corresponds to performing the second task.

6. The method of claim 1, further comprising:
detecting that the worker has incorrectly performed the first task; and
transmitting to the worker, via the mobile computing device, a third instruction to redo the first task.

7. The method of claim 1, further comprising transmitting to one or more light-emitting devices a further command to provide a visual indicator to the worker that facilitates performing the second task.

8. The method of claim 1, wherein the light-emitting device activates the visual indicator in response to receiving the command from the computing system.

9. The method of claim 1, wherein:
the computing system communicates with the mobile computing device via a first connection; and
the computing system communicates with the light-emitting device via a second connection that is separate from the first connection.

10. The method of claim 1, further comprising:
transmitting to another mobile computing device worn by another worker, a third instruction related to performing a third task included in the plurality of tasks; and
transmitting, from the computing system to another light-emitting device, another command to activate a visual indicator that facilitates performing the third task.

11. One or more non-transitory computer-readable media storing instructions that, when executed by one or more processors, cause the one or more processors to perform the steps of:
monitoring a position of a worker within a space associated with a construction project via an electronic positioning system comprising at least one of indoor global positioning system (GPS), a micro-GPS system, an iBeacon system, or a radio frequency identification (RFID) system;
selecting a first task of the construction project from a plurality of tasks based on the position of the worker within the space;
transmitting to a mobile computing device worn by the worker, a first instruction related to performing the first task;
transmitting, from a computing system to a light-emitting device, a command to activate a visual indicator to the worker by emitting a particular color associated with the worker, wherein the computing system is separate from the mobile computing device, wherein the light-emitting device is separate from the mobile computing device and resides at a designated location associated with the first task, and wherein transmitting the command to the light-emitting device occurs separately from the mobile computing device;
based on an input received from the mobile computing device, determining that the worker has completed the first task of the construction project;
selecting, from a database that tracks eligibility of the plurality of tasks, a second task included in the plurality of tasks that the worker is eligible to perform from a database that tracks eligibility of the plurality of tasks; and
transmitting to the worker, via the mobile computing device, a second instruction related to performing the second task.

12. The one or more non-transitory computer-readable media of claim 11, further comprising transmitting to one or more light-emitting devices a further command to provide a visual indicator to the worker that facilitates performing the second task.

13. The one or more non-transitory computer-readable media of claim 12, wherein the visual indicator indicates an orientation or positioning of a workpiece with respect to a robot for fabrication or assembly by the robot of a component configured for constructing in-part a structure within a workspace associated with the construction project.

14. The one or more non-transitory computer-readable media of claim 11, wherein the first task of the construction project comprises the worker arriving at the designated location within a work space associated with the construction project.

15. A system, comprising:
a memory storing a coordination engine;
a processor that is coupled to the memory and, when executing the coordination engine, is configured to:
monitor a position of a worker within a space associated with a construction project via an electronic positioning system comprising at least one of indoor global positioning system (GPS), a micro-GPS system, an iBeacon system, or a radio frequency identification (RFID) system;
selecting a first task of the construction project from a plurality of tasks based on the position of the worker within the space;
transmit to a mobile computing device worn by the worker, a first instruction related to performing the first task;
transmit to a light-emitting device a command to activate a visual indicator to the worker by emitting a particular color associated with the worker, wherein the system executing the coordination engine is separate from the mobile computing device, wherein the light-emitting device is separate from the mobile computing device and resides at a designated location associated with the first task, and wherein transmitting the command to the light-emitting device occurs separately from the mobile computing device;

based on an input received from the mobile computing device, determine that the worker has completed the first task of the construction project;

select, from a database that tracks eligibility of the plurality of tasks, a second task included in the plurality of tasks that the worker is eligible to perform; and transmit to the worker, via the mobile computing device, a second instruction related to performing the second task.

16. The system of claim 15, wherein the first task of the construction project comprises performing one of a fabrication operation or an assembly operation of a component configured for constructing in-part a structure within a workspace associated with the construction project.

17. The system of claim 15, wherein determining that the worker has completed the first task comprises receiving via the mobile computing device a confirmation from the worker that the first task is complete.

18. A computer-implemented method for performing tasks associated with a construction project, the method comprising:

monitoring a position of a worker within a space associated with the construction project via an electronic positioning system comprising at least one of indoor global positioning system (GPS), a micro-GPS system, an iBeacon system, or a radio frequency identification (RFID) system;

selecting a first task of the construction project from a plurality of tasks based on a task being performed by a different worker within the space;

transmitting to a mobile computing device worn by the worker, a first instruction related to performing the first task;

transmitting, from a computing system to a light-emitting device, a command to activate a visual indicator to the worker by emitting a particular color associated with the worker, wherein the computing system is separate from the mobile computing device, wherein the light-emitting device is separate from the mobile computing device and resides at a designated location associated with the first task, and wherein transmitting the command to the light-emitting device occurs separately from the mobile computing device;

based on an input received from the mobile computing device, determining that the worker has completed the first task of the construction project;

selecting, from a database that tracks eligibility of each of the plurality of tasks, a second task included in the plurality of tasks that the worker is eligible to perform; and transmitting to the worker, via the mobile computing device, a second instruction related to performing the second task.

* * * * *